US012327428B2

(12) United States Patent
Kinugawa (10) Patent No.: US 12,327,428 B2
(45) Date of Patent: Jun. 10, 2025

(54) AUTHENTICATION DEVICE, REGISTRATION DEVICE, AUTHENTICATION METHOD, REGISTRATION METHOD, AND STORAGE MEDIUM

(71) Applicant: CANON KABUSHIKI KAISHA, Tokyo (JP)

(72) Inventor: Shogo Kinugawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 375 days.

(21) Appl. No.: 17/729,078

(22) Filed: Apr. 26, 2022

(65) Prior Publication Data
US 2022/0392256 A1 Dec. 8, 2022

(30) Foreign Application Priority Data
Jun. 7, 2021 (JP) .................................. 2021-095097

(51) Int. Cl.
*G06V 40/16* (2022.01)
*G06T 7/73* (2017.01)
*G06V 10/94* (2022.01)

(52) U.S. Cl.
CPC .............. *G06V 40/168* (2022.01); *G06T 7/73* (2017.01); *G06V 10/945* (2022.01);
(Continued)

(58) Field of Classification Search
CPC .. G06V 40/168; G06V 10/945; G06V 40/161; G06V 40/172; G06V 2201/07;
(Continued)

(56) References Cited

FOREIGN PATENT DOCUMENTS

| JP | 2012-018593 A | | 1/2012 |
| JP | 2019028936 A | * | 2/2019 |
| JP | 2020052788 A | * | 4/2020 |

OTHER PUBLICATIONS

Deng, J. et al., "ArcFace: Additive Angular Margin Loss for Deep Face Recognition" CVPR, arXiv: 1801.07698v3 (Feb. 2019) pp. 1-11.

(Continued)

*Primary Examiner* — Samir A Ahmed
(74) *Attorney, Agent, or Firm* — Carter, DeLuca & Farrell LLP (57) ABSTRACT

An authentication device includes a feature amount generation unit for generating a feature amount of an object in an image, a registered data acquisition unit for acquiring registered data where a feature amount of a predetermined object in an image is registered in advance as a registered feature amount, and NG information associated with the registered feature amount unsuitable for authentication is recorded, a similarity acquisition unit for acquiring a similarity between the predetermined feature amount and the registered feature amount acquired from the registered data acquisition unit, and a determination unit for performing authentication if the degree of similarity acquired by the degree of similarity acquisition unit satisfies a predetermined authentication condition, and even if the degree of similarity satisfies the predetermined authentication condition, if the NG information associated with the registered feature amount is acquired, the predetermined feature amount is not authenticated.

10 Claims, 9 Drawing Sheets

(52) U.S. Cl.
CPC .......... *G06V 40/161* (2022.01); *G06V 40/172* (2022.01); *G06T 2207/30201* (2013.01); *G06V 2201/07* (2022.01)

(58) Field of Classification Search
CPC ...... G06V 10/987; G06V 10/993; G06T 7/73; G06T 2207/30201
See application file for complete search history.

(56) References Cited

OTHER PUBLICATIONS

Notice of Reasons for Refusal issued by the Japanese Patent Office on Mar. 6, 2025 in corresponding JP Patent Application No. 2021-095097, with English translation.

\* cited by examiner

AUTHENTICATION DEVICE, REGISTRATION DEVICE, AUTHENTICATION METHOD, REGISTRATION METHOD, AND STORAGE MEDIUM

BACKGROUND OF THE INVENTION

Field of the Invention

The present invention relates to an authentication device, registration device, authentication method, registration method, and storage medium and the like.

Description of the Related Art

A technique for identifying whether or not a detected face is that of a registered person by detecting the face of a person from a captured image, extracting a feature amount of the face area, and comparing the extracted feature amount with a previously registered feature amount is known.

However, in the feature amounts of a registered face, if a feature amount of a registered face when the face is erroneously detected or a feature amount of a face image with strong blur, out-of-focus, or noise is included, in a case where the image to be authenticated happens to be similar, a different person may be erroneously recognized as the person with the registered face.

As a technique to avoid this problem, for example, Japanese Patent Application Laid-Open No. 2012-18593 discloses a configuration in which the degree of reliability of a face image and the degree of reliability of each organ that constitutes the face in the face image are obtained, the authentication process is executed only when their reliability is higher than a predetermined value, and thereby reducing erroneous authentication in authentication processing using the face image.

However, in the method disclosed in Japanese Patent Application Laid-Open No. 2012-18593, in a case of an image unsuitable for authentication or the like that slightly exceeds a threshold value of reliability, it is not possible to prevent the erroneous authentication of the image.

An object of the present invention is to solve the above described problem, and a further object is to provide an authentication device capable of preventing erroneous authentication due to an image unsuitable for authentication.

SUMMARY OF THE INVENTION

To achieve the above mentioned object, an authentication device according to one aspect of the present invention comprises the following:
  at least one processor or circuit configured to function as:
  a feature amount generation unit configured to generate a feature amount of an object included in an image,
  a registered data acquisition unit configured to acquire registered data in which a feature amount of a predetermined object included in an image is registered in advance as a registered feature amount, and NG information associated with the registered feature amount that is unsuitable for authentication is registered,
  a similarity acquisition unit configured to acquire a degree of similarity between the predetermined feature amount generated from an authentication image by the feature amount generation unit and the registered feature amount acquired from the registered data acquisition unit, and
  a determination unit configured to perform authentication in a case in which the degree of similarity acquired by the similarity acquisition unit satisfies a predetermined authentication condition, and even if the degree of similarity satisfies the predetermined authentication condition, in a case in which the NG information associated with the registered feature amount is acquired from the registered data acquisition unit, the predetermined feature amount generated by the feature amount generation unit is not authenticated.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Note that, in the embodiments, an example in which a network camera is applied as an authentication device will be described. However, the authentication device may be provided in a digital still camera, a digital movie camera, a smartphone with a camera, a tablet computer with a camera, an on-vehicle camera, a drone camera, a robot, and the like. In addition, it may be provided in an electronic apparatus such as a PC terminal connectable via a network and the like. Further, the authentication device may be used in a system for performing log-in, billing, and the like on the basis of an authentication result.

First Embodiment

In a First Embodiment, a monitoring system for detecting in real time whether or not a person registered in advance appears in a video image captured by a network camera (monitoring camera) will be described as an example.

Note that the unsuitable authentication flag is a flag corresponding to each of a feature amount in a storage unit, and if the corresponding feature amount is unsuitable for authentication, the value is true, and if it is sufficient for authentication, the value becomes false. A feature amount that is unsuitable for authentication is, for example, a feature amount of a face image that is erroneously detected or that has strong blur, out-of-focus, or noise.

Note that in the present embodiment, an example of an authentication device for performing authentication of a face of a person and the like will be described. However, the authentication device according to the present embodiment may be configured to authenticate not only a predetermined region such as a face, but may also use a feature amount of a predetermined region such as a finger, a palm, a body shape of a whole body, or clothing. In addition, an object other than a person (a pet, a vehicle registration number, a securities certificate, and the like) may be authenticated.

Figure 1:
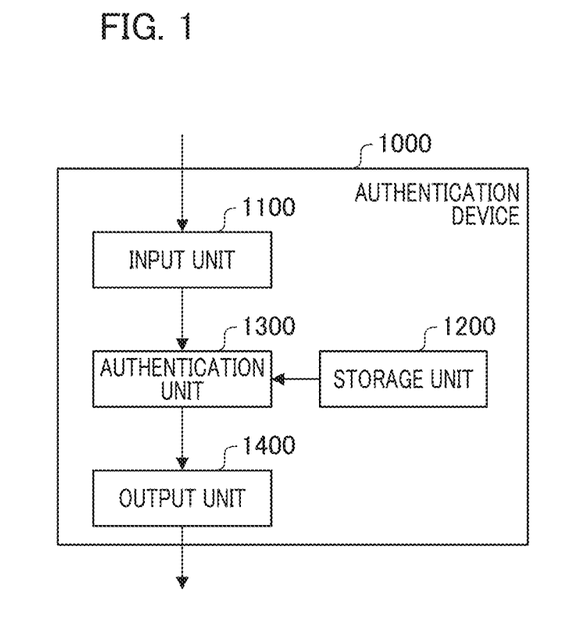
FIG. 1 is a block diagram of the functions of an authentication device 1000 according to a first embodiment.

FIG. 1 is a block diagram of the functions of an authentication device 1000 according to the First Embodiment. As shown in FIG. 1, the authentication device 1000 includes an input unit 1100 and a storage unit 1200 configured to hold, feature amount, and the above described unsuitable authentication flag. In addition, an authentication unit 1300 configured to authenticate by comparing a feature amount of a subject reflected in a video image with a feature amount held in the storage unit output unit 1400 that provides notification about of the result are included.

Note that the respective functional blocks shown in FIG. 1 are realized by executing a computer program stored in a memory serving as a storage medium in a computer included in the authentication device 1000. However, for example, a part or all of the processing of the authentication device 1000 may be realized by hardware. As hardware, a dedicated circuit (ASIC), a processor (reconfigurable processor, DSP) and the like may be used.

In addition, the respective functional blocks shown in FIG. 1 may be configured as a system comprising separate devices connected to each other without being built in the same housing The input unit 1100 acquires a video to be processed. In the present embodiment, each consecutive frame of a moving image video is continuously acquired as a still image in a time series. Hereinafter, a still image of a single frame of a moving image video is simply referred to as a frame.

In addition, in the present embodiment, the input unit 1100 is, for example, a monitoring camera attached to a ceiling and the like. However, it may be a device configured to continuously supply frames, and may be, for example, a readable image reproduction device that holds a video recorded in advance.

In addition, the input unit 1100 may be disposed at a location that is physically separate from the other blocks of FIG. 1, or may be configured, for example, to transfer a video to the authentication unit 1300 via a wireless network.

The storage unit 1200 holds and associates a plurality of registered feature amounts that have been registered in advance, and an unsuitable authentication flag (NG information) that shows that each of the registered feature amounts are unsuitable for authentication, for example, in a case where images are blurred, damaged, having a low contrast, or having a low S/N ratio.

That is, in the storage unit 1200, a feature amount of a predetermined region of a predetermined object included in an image is registered as a registered feature amount in advance, and NG information is associated with a registered feature amount that is unsuitable for authentication and registered. Here, as described above, a predetermined object includes, for example, a person and the like, and the predetermined region includes a portion such as a face. Note that, when each of a registered feature amount is suitable for authentication, information indicating that the registered feature amount is sufficient (that is, information in which an unsuitable authentication flag is set to false) is held in association with the registered feature amount. The storage unit 1200 may also be, for example, an external data server connectable via a network.

The detailed configuration with respect to the authentication unit 1300 will be described below. The authentication unit 1300 itself may be a software module that operates on a computer of a server or workstation connected to the input unit 1100. Alternatively, it may be a computer program that is executed inside a dedicated circuit such as a SoC (System On Chip).

The output unit 1400 outputs the output of the authentication unit 1300, that is, who the subject is, to the outside. The output unit 1400 is typically a display (image display unit), and performs notification by superimposing and displaying an authentication result on a video from a camera. However, it may be output by using other methods such as voice or vibration. That is, for example, notification is provided to the surroundings by sound from a speaker, the notification may be provided to a portable terminal of the user, or may be notified by using a plurality of media.

Here, authentication processing and registration processing performed by the authentication device 1000 will be described.

[Authentication Processing]

Figure 2:
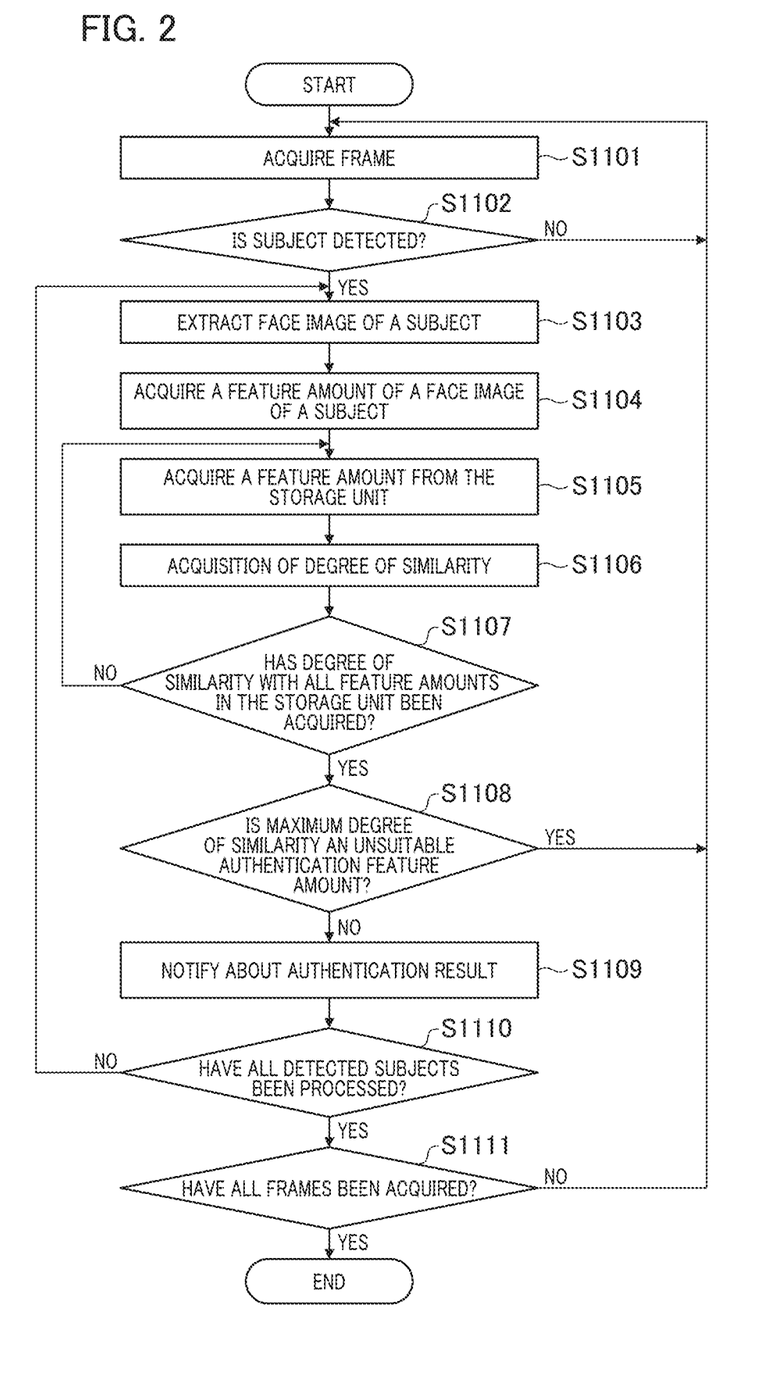
FIG. 2 is a flowchart showing an authentication processing of the first embodiment.

FIG. 2 is a flowchart showing an authentication processing of the first embodiment. An example of actual processing in which the authentication device 1000 authenticates the subject will be described with reference to FIG. 2.

Note that by executing a computer program stored in the memory as a storage medium by a computer included in the authentication device 1000, the operation of each step of the flowcharts of FIGS. 2 to 4 and FIGS. 6 to 9 is performed.

In the example of FIG. 2, each frame is continuously acquired from the input unit 1100, authentication is performed by matching the feature amount of the face of the subject detected from each frame by the authentication unit 1300 and each registered feature amount registered in advance in the storage unit 1200, and the authentication result is output by the output unit 1400.

Specifically, first, in step S1101, a frame image is acquired from the input unit 1100. Then, in step S1102 (region detection step), detection of a face region (face frame) that is a predetermined region of a person serving as an object included in the frame image acquired in step S1101 (hereinafter referred to as face detection) is performed. Here, step S1102 functions as a region detection unit for detecting a predetermined region of an object included in the image. Note that, in a case where one or a plurality of faces are detected, detection of the respective face regions (face frames) is performed. In addition, in a case in which a face is detected, the processing proceeds to step S1103, and if a face cannot be detected, the processing returns to step S1101 and the next frame image is acquired.

In step S1103, the face image of a subject captured in the frame image is acquired for each face frame detected in step S1102, and in step S1104, a feature amount is acquired from the face image acquired in step S1103.

Here, step S1103 and step S1104 function as feature amount generation unit (feature amount generation step) that generates a predetermined feature amount from a predetermined area (such as a face area) of an object (such as a person) included in a predetermined image for authentication. Note that the method of acquiring a feature amount will be described below.

In step S1105, one registered feature amount as registered data is extracted from the storage unit 1200 such as an external data server and the like disposed in the housing of the authentication device 1000 or connected to the authentication device 1000 via a network. Here, step S1105 functions as a registered data acquisition unit (registered data acquisition step), and acquires, as registered data, the registered feature amount and NG information associated with a registered feature amount that is unsuitable for authentication.

Next, in step S1106, the degree of similarity between the predetermined feature amount of an authentication subject acquired in step S1104 and the registered feature amount acquired in step S1105 is acquired. Here, step S1106 functions as a similarity acquisition unit (similarity acquisition step) for acquiring a plurality of similarities by calculating the similarity between the predetermined feature amount generated by the feature amount generation unit and the plurality of registered feature amounts stored in the storage unit 1200, respectively. The method for acquiring similarity will be described later.

In step S1107, a check is performed to determine whether the respective similarities between the predetermined features of the face image acquired in step S1104 and all registered features in the storage unit 1200 have been acquired. If the degree of similarity with all the registered feature amounts in the storage unit 1200 is acquired, the processing proceeds to step S1108. If not, the processing returns to step S1105 to acquire a different registered feature amount in the storage unit 1200.

In step S1108, a maximum value is acquired from the plurality of similarities acquired in step S1106. Then, the unsuitable authentication flag (NG information) associated with the registered feature amount in the storage unit 1200 having the similarity of the maximum value is acquired, and whether or not the unsuitable authentication flag is true or false is checked.

Note that, in the present embodiment, when the predetermined authentication condition, that is, when the degree of similarity with the registered feature amount becomes the similarity of the maximum value, is satisfied, NG information is checked with respect to the registered feature amount. However, for example, when the degree of similarity to the registered feature amount is equal to or greater than a predetermined threshold value, a predetermined authentication condition may be used In step S1108, if the unsuitable authentication flag is true (that is, unsuitable for authentication), the processing returns to step S1101, and if it is false (that is, sufficient for authentication), the processing proceeds to step S1109 (notification step). Here, step S1108 functions as a determination unit (determination step), and performs authentication in a case in which the above described degree of similarity acquired by the similarity acquisition unit satisfies a predetermined authentication condition (for example, an authentication condition of maximum degree of similarity).

In contrast, even if the similarity satisfies the predetermined authentication condition (for example, an authentication condition of maximum degree of similarity), in a case in which the NG information associated with a registered feature amount that satisfies this condition is acquired, the predetermined feature amount generated by the feature amount generation unit is not authenticated.

In step S1109, the authentication result is acquired based on the plurality of degrees of similarity acquired in step S1106. That is, if the unsuitable authentication flag is false (that is, sufficient) in step S1108, authentication is performed when the degree of similarity between the feature amount of the face image detected in step S1102 matches the face image corresponding to the maximum feature amount.

Then, the authentication result is notified to the user. Here, step S1109 functions as a notification unit (notification step) that provides notification about the authentication result based on the degree of similarity performed by the determination unit. Note that in the present embodiment, as described above, step S1109, serving as the notification unit, does not notify the user of the authentication result in a case in which the predetermined feature amount generated by the feature amount generation unit is not authenticated by step S1108 serving as the determination unit. Note that notification of failure in authentication is also possible.

Next, in step S1110, whether or not the processing from step S1103 to step S1109 is performed for the face frames of all the subjects detected in step S1102 is checked.

In a case where processing is performed on all face frames, the processing proceeds to step S1111. Otherwise, the processing returns to step S1103.

In step S1111, whether all the frame images to be acquired in step S1101 have been acquired is checked. If all of them have been acquired, the processing ends. Otherwise, the processing returns to step S1101.

As explained above, in the present embodiment, in a case where the face image detected in step S1108 is matched with a unsuitable authentication face image, the authentication result is not notified. Accordingly, it is possible to avoid erroneous authentication.

Next, the acquisition of the feature amount shown in the flowchart (step S1104) will be described in detail.

Here, a feature amount necessary for identifying an individual is extracted from the face image. The method may be arbitrary, but in the present embodiment, the feature amount is extracted as follows. First, the coordinates of the face image are normalized on the basis of the detected face feature point coordinates. For example, on the basis of the detected positions of both eyes, the image is rotated/scaled so that the line segment connecting both eyes is horizontal at a predetermined length/position on the image.

Then, a rectangular region for extracting a feature amount is set with respect to the face image. The size of the region is arbitrary, but it is preferable that it include all the organs such as the eyes and mouth that represent the characteristics of the individual, but not the background. Then, the pixel value of a rectangular region of the face image is converted into a vector by a neural network trained using, for example, the method described in J. Deng, J. Guo, and S. Zafeiriou "ArcFace: Additive Angular Margin Loss for Deep Face Recognition" in CVPR, 2019. This is made the feature amount of the face image.

Next, the acquisition of the degree of similarity (step s1106) shown in the flowchart will be described in detail.

In step S1106, the feature amount of the target face image is matched with one registered feature amount in the storage unit to calculate the degree of similarity indicating how much the person is likely to be the same person. The method is arbitrary, but the method is selected in such a way that the larger the degree of similarity, the more similar the feature amount is, that is, the feature amount of the target face image and one registered feature amount in the memory are identical to each other. Examples include a method of taking a cosine of an angle formed by vectors of a feature amount or a method of taking a reciprocal of Euclidean distance between vectors of a feature amount.

The authentication processing according to a First Embodiment has hereto been explained.

Here, the registration processing according to a First Embodiment will be described.

[Registration Processing]

[Registration Processing of a Registered Person Feature Amount]

Hereinafter, a method of registering a registered person feature amount in the storage unit 1200 will be described.

Figure 3:
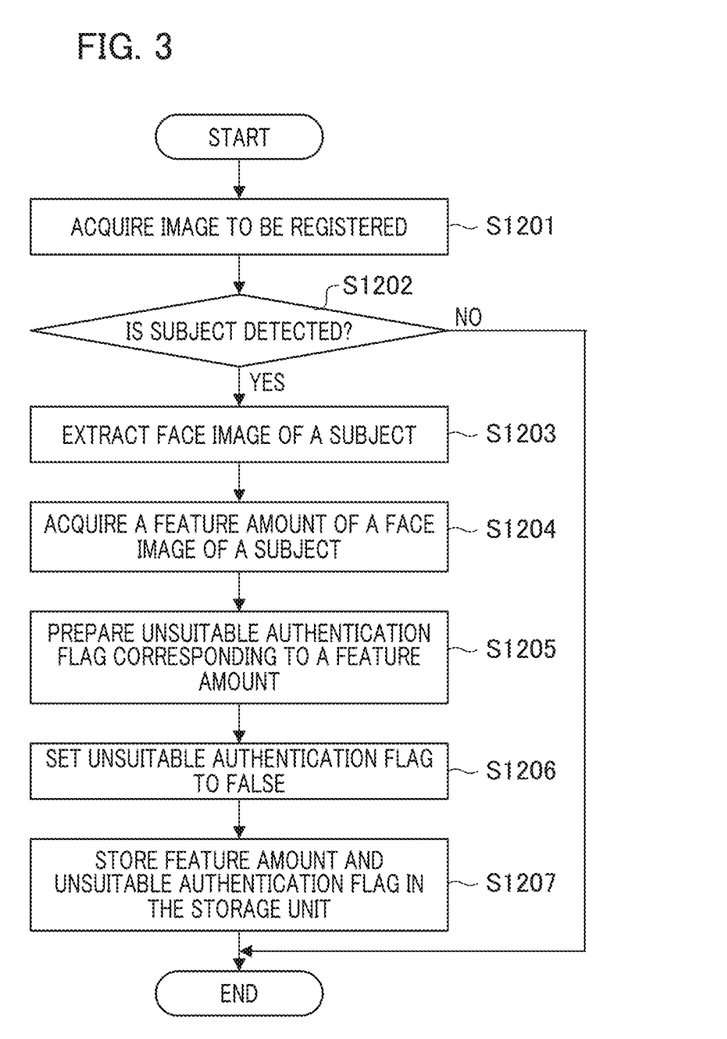
FIG. 3 is a flowchart showing a processing of registering a registered person feature amount in a storage unit 1200 according to the first embodiment.

FIG. 3 is a flowchart showing a processing of registering a registered person feature amount in the storage unit 1200 according to the First Embodiment. Note that, in the present embodiment, although an example in which the registration processing is executed in the authentication device 1000 is described, the registration processing of FIG. 3 may be performed in a registration device for authentication that is different from the authentication device 1000.

In step S1201, an image in which a predetermined object (person) to be registered in the storage unit 1200 is reflected is acquired from the input unit 1100. Then, in step S1201, face detection for the image acquired in step S1201 and detection of the face frame corresponding to the detected face is performed, and if face detection is possible, the processing proceeds to step S1203. If a face detection is not possible, the processing ends.

In step S1203, the face image is cropped from the image acquired in step S1201 by using the face frame detected in step S1202, and in step S1204, a feature amount is acquired from the face image cropped in step S1203. That is, step S1203 and step S1204 function as a feature amount generation unit (feature amount generation step) for generating a feature amount from a predetermined region of an object included in the image.

Next, in step S1205, an unsuitable authentication flag corresponding to the feature amount acquired in step S1204 is prepared. In step S1206, the value of the unsuitable authentication flag prepared in step S1205 is set to be false by default.

In step S1207, the feature amount of the face image acquired in step S1204 and the unsuitable authentication flag in which the value was set in step S1206 are associated and stored in the storage unit 1200, and the processing ends. Steps S1205 to S1207 function as a registration unit (registration step) in which a feature value of a predetermined area of a predetermined object included in an image is registered as a registered feature amount in advance, and NG information is registered in association with the registered feature amount that is unsuitable for authentication.

[Registration Processing of Unsuitable Authentication Feature Amount]

In the present embodiment, a face image is presented to a user, who is the administrator of the monitoring camera, with the registered person feature amount, in a case where the authentication suitability/authentication unsuitability is determined by the user, and the user determines that the authentication is unsuitable, the unsuitable authentication feature amount is registered.

Below, a method for registering a registered person feature amount that is specified by the user as an unsuitable authentication feature amount in the storage unit 1200 will be described.

Figure 4:
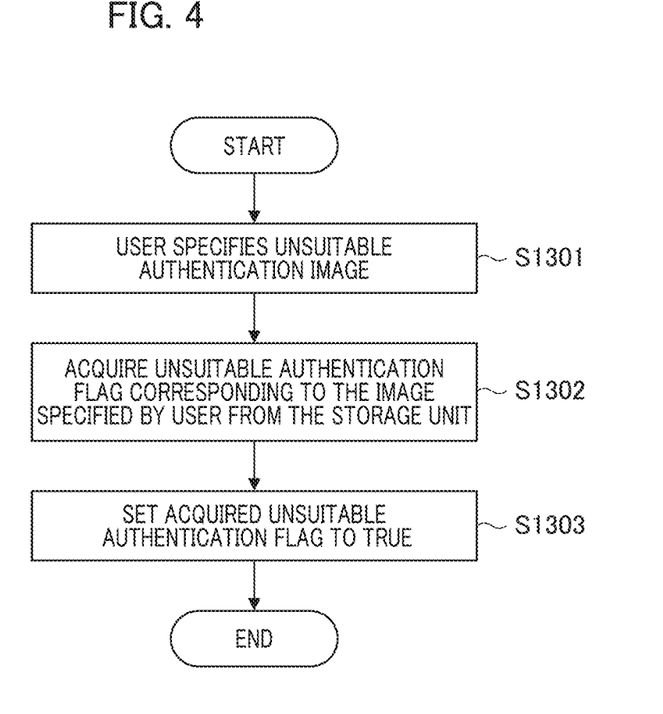
FIG. 4 is a flowchart showing a processing of changing a registered person feature amount to an unsuitable authentication feature amount according to a specification of a user.

FIG. 4 is a flowchart showing a processing of changing a registered person feature amount to an unsuitable authentication feature amount according to a specification of a user.

In step S1301, the user specifies that a certain image is an unsuitable authentication image. The process of registering an unsuitable authentication feature amount is explained using FIG. 5.

Figure 5:
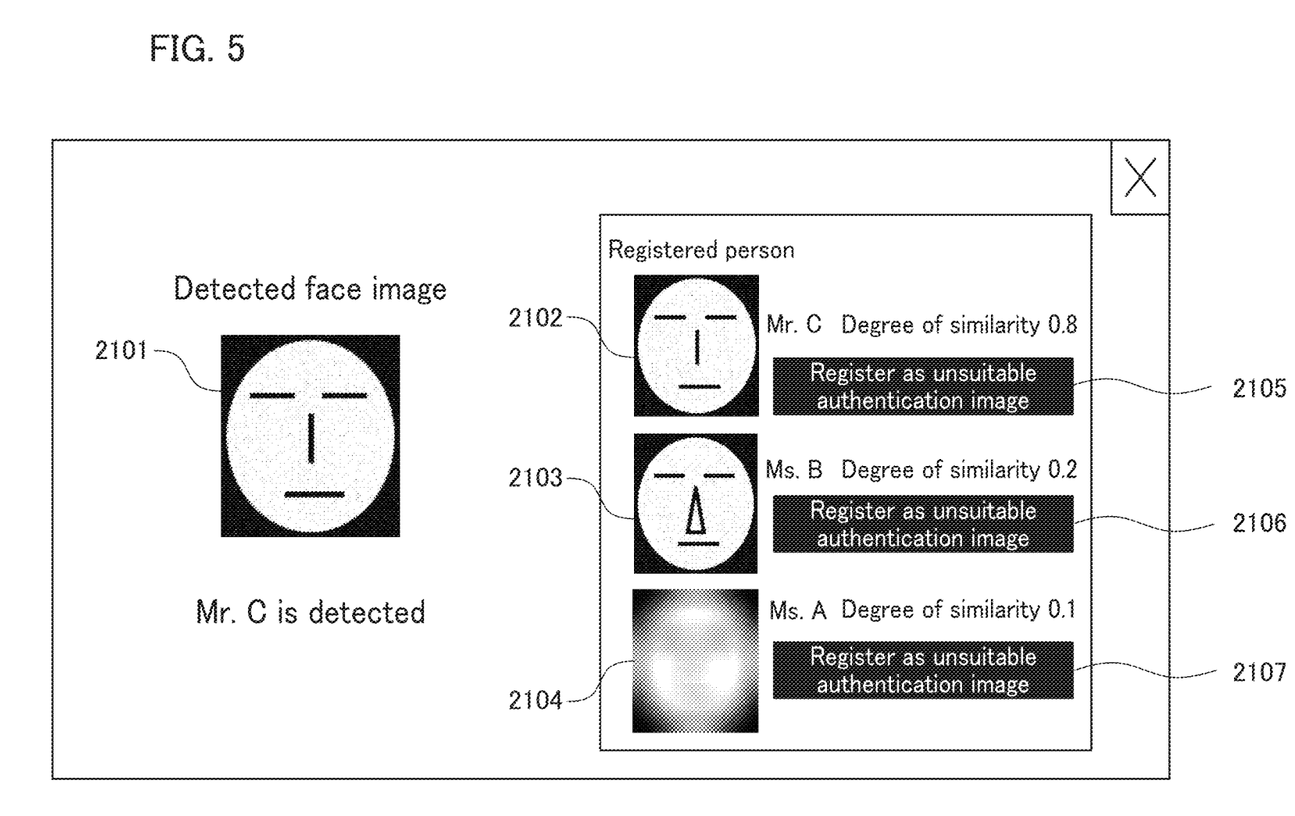
FIG. 5 is a diagram showing an example of a screen when a user specifies an image unsuitable authentication image.

FIG. 5 is a diagram showing an example of a screen when a user specifies an unsuitable authentication image.

2101 is the face image detected from a monitoring camera, 2102, 2103, and 2104 are the face images of registered persons that have been registered in advance in the storage unit 2100. In the figure, 2105, 2106, and 2107 are buttons for registering an unsuitable authentication image. In the example of FIG. 5, three registered face images having a high degree of similarity to the detected face image are displayed. The user determines that the face image 2104 is unsuitable for authentication based on the displayed registered face image, and specifies the unsuitable authentication image by clicking the unsuitable authentication registration button 2107.

In step S1302, the unsuitable authentication flag corresponding to the unsuitable authentication image specified in step S1301 is acquired from the storage unit 1200.

In step S1303, the value of the unsuitable authentication flag acquired in step S1302 is set to true (that is, unsuitable).

Thus, in the present embodiment, the storage unit 1200 stores an image of a plurality of predetermined objects in association with a feature amount of a predetermined region of the plurality of predetermined objects as registered data. In addition, the notification unit is provided with a display unit for displaying the images of the plurality of objects stored in the storage unit 1200 in association with authentication suitability information (NG information). Furthermore, in the present embodiment, the display unit is also characterized in that it has a UI (User Interface) for the user to change the displayed authentication suitability information (NG information).

[Method for Automatically Extracting Unsuitable Authentication Feature Amount Candidate within a Registered Person Feature Amount]

In addition to a method in which the user checks and specifies the face image for an unsuitable authentication feature amount, from among the registered person feature amounts in the storage unit 1200, a candidate unsuitable authentication feature amount may also be automatically extracted and presented to the user.

Figure 6:
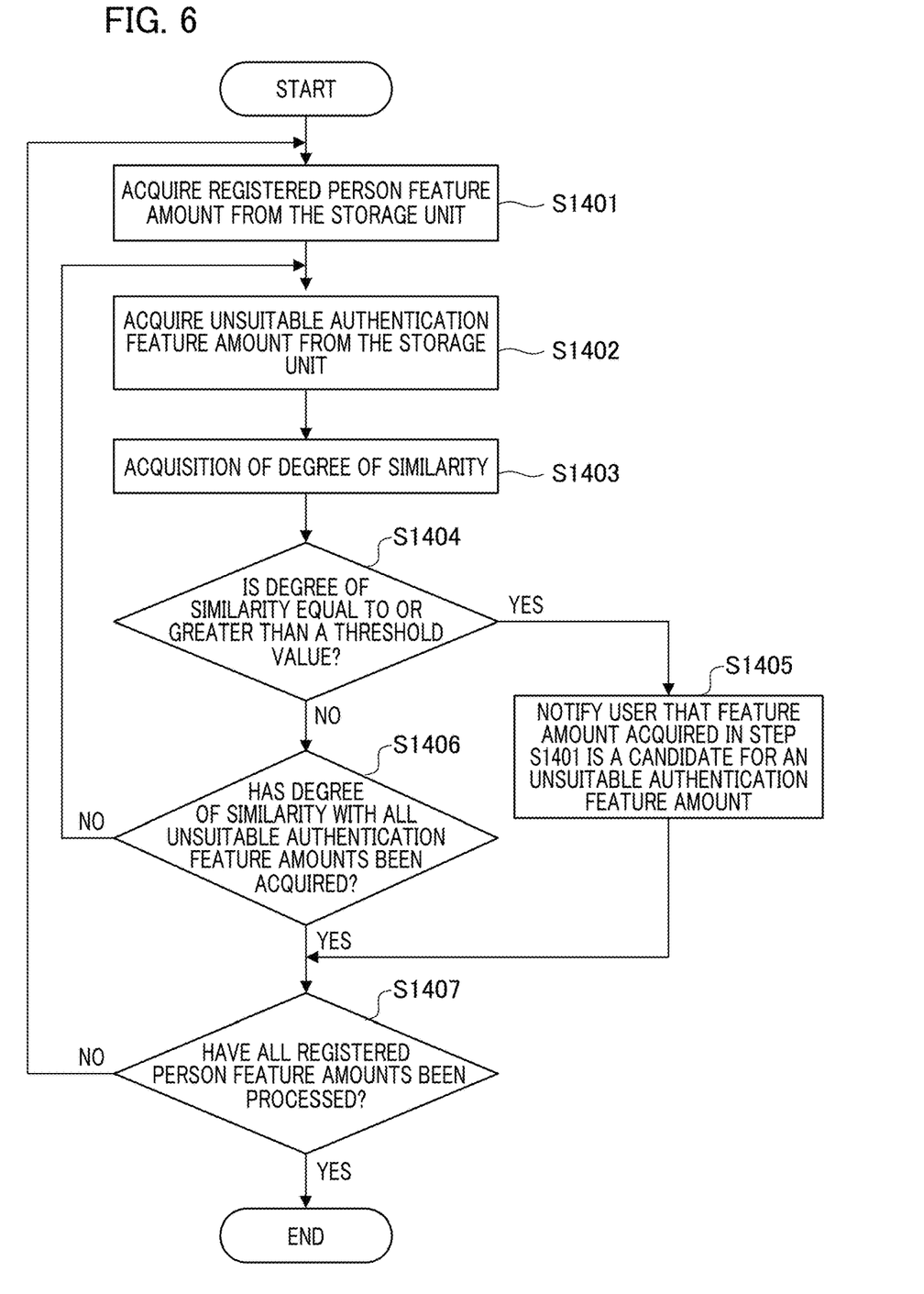
FIG. 6 is a flowchart showing a processing of extracting candidates for an unsuitable authentication feature amount from the registered person feature amount in the storage unit 1200 according to the first embodiment.

FIG. 6 is a flowchart showing a processing of extracting candidate unsuitable authentication feature amount from among the registered person feature amounts in the storage unit 1200 according to the first embodiment.

In the flowchart of FIG. 6, the degree of similarity between the registered person feature amount in the storage unit 1200 and the unsuitable authentication feature amount is obtained, and if the degree of similarity is equal to or greater than a threshold value, the user is notified that the registered person feature amount may be an unsuitable authentication feature amount.

In step S1401, one registered person feature amount is acquired from the storage unit 1200. In step S1402, one unsuitable authentication feature amount is acquired from the storage unit 1200. In step S1403, the degree of similarity between the feature amount acquired in step S1401 and the feature amount acquired in step S1402 is acquired.

In step S1404, it is determined whether the feature amount acquired in step S1403 is equal to or greater than a threshold value. If is equal to or greater than a threshold value, the processing proceeds to step S1405. Otherwise, the processing proceeds to step S1406.

In step S1405, the registered person feature amount acquired in step S1401 is notified to the user as possibly being an unsuitable authentication feature amount. The processing then proceeds to step S1407. The notification to the user can be performed in the same manner as in the [Registration processing of an unsuitable authentication feature amount] described above. For example, a display such as 2102 to 2107 shown in FIG. 5 is performed and notified.

In step S1406, whether the acquired degree of similarity between the registered person feature amount acquired in step S1401 and all unsuitable authentication feature amounts has been acquired is checked. If the degree of similarity with all unsuitable authentication feature amounts is acquired, the processing proceeds to step S1407. Otherwise, the processing returns to step S1402.

In step S1407, the processing from step S1401 to step S1406 is checked to confirm that it has been performed for all registered person feature amounts. If the processing has been performed for all registered person feature amounts, the processing ends. Otherwise, the processing returns to step S1401.

[Method for Reducing Unsuitable Authentication Feature Amount]

In the authentication processing according the First Embodiment, acquiring of the degree of similarity between the feature of the subject and all the feature amounts in the storage unit 1200 is performed. Therefore, as the number of unsuitable authentication feature amounts in the storage unit 1200 increases, the time required for the authentication processing increases.

Therefore, in order to reduce the time required for the authentication processing, a mechanism for reducing the number of unsuitable authentication feature amounts in the storage unit 1200 according to the First Embodiment will be described below.

Figure 7:
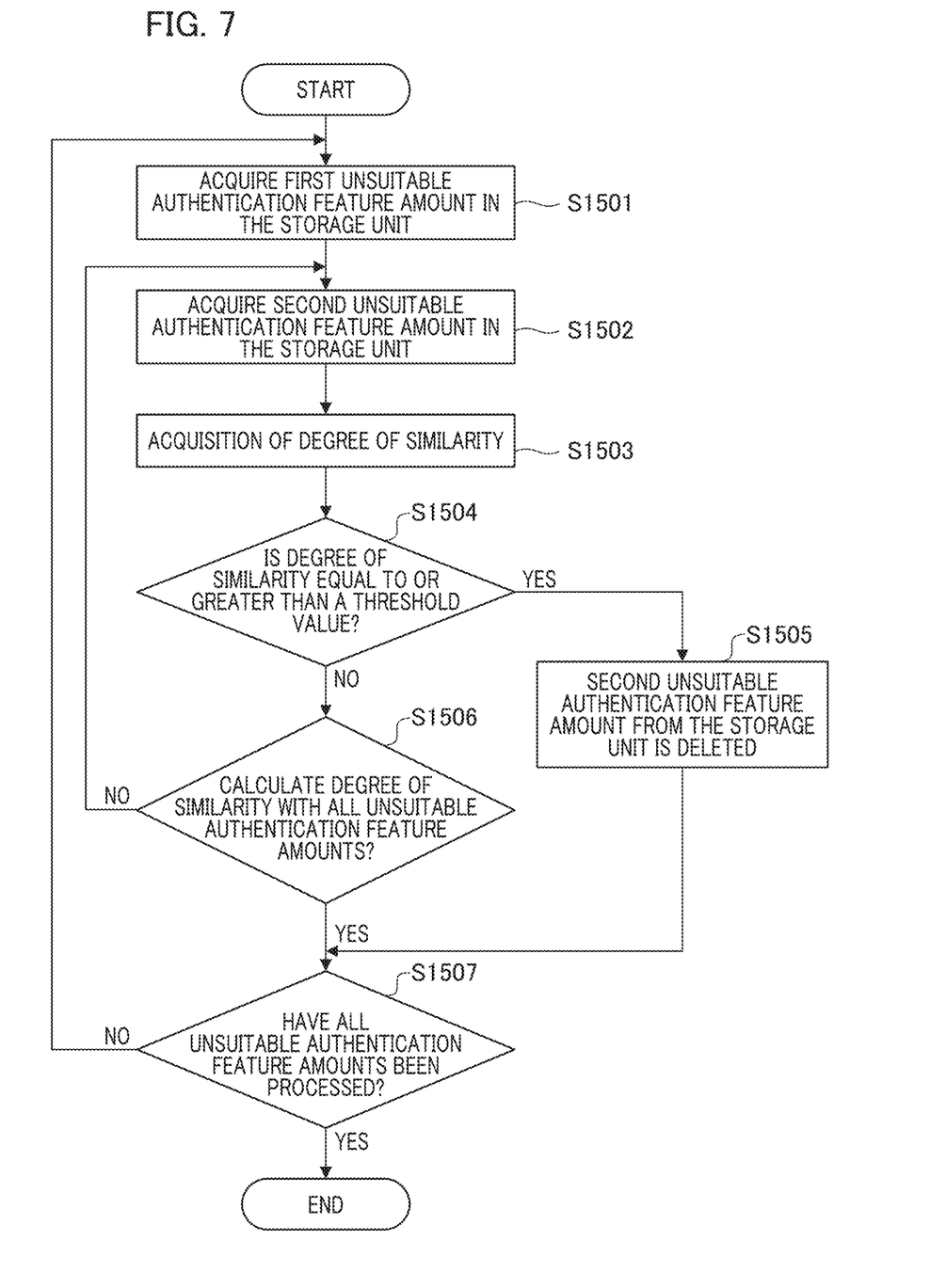
FIG. 7 is a flowchart showing a processing of reducing the number of unsuitable authentication feature amount in the storage unit 1200 according to the first embodiment.

FIG. 7 is a flowchart showing a processing of reducing the number of unsuitable authentication feature amounts in the storage unit 1200 according to the First Embodiment.

In step S1501, the first unsuitable authentication feature amount is acquired from the storage unit 1200.

In step S1502, a second unsuitable authentication feature amount that is different from the first unsuitable authentication feature amount is acquired from the storage unit 1200.

In step S1503, the degree of similarity between the first unsuitable authentication feature amount acquired in step S1501 and the second unsuitable authentication feature amount acquired in step S1502 is acquired.

In step S1504, whether the degree of similarity acquired in step S1503 is greater than or equal to a threshold value is determined. If it is equal to or greater than the threshold value, the processing proceeds to step S1505, and otherwise, it proceeds to step S1506.

In step S1505, the second unsuitable authentication feature amount acquired in step S1502 is deleted from the storage unit 1200.

In step S1506, whether the feature amount acquired in step S1501 has acquired a degree of similarity with all unsuitable authentication feature amounts is checked. If the degree of similarity with all unsuitable authentication feature amounts have been acquired, the processing proceeds to step S1507. Otherwise, the processing returns to step S1502.

In step S1507, whether the processing from step S1501 to step S1506 has been performed with respect to all unsuitable authentication feature amounts is checked. If processing has been performed with respect to all unsuitable authentication feature amounts, the processing ends. Otherwise, the processing returns to step S1501.

In this way, by the processing of the flowchart in FIG. 7 of the First Embodiment, it is possible to delete an unsuitable authentication feature amount with a high degree of similarity, reduce the number of unsuitable authentication feature amount in the storage unit 1200, and reduce the time required for authentication processing.

Second Embodiment

In the First Embodiment, a monitoring camera system for detecting and outputting in real time whether or not a registered person is present in the image captured by the monitoring camera has been explained.

In a Second Embodiment, an authentication device for determining whether a face image captured by a user operation is that of a person registered in advance will be explained.

Similar to the First Embodiment, the present embodiment will be described using an example in which authentication is performed using the face of a person. However, an authentication device according to the Second Embodiment may also authenticate not only with a face, but also with a finger, palm, or whole body shape or clothing, or it may authenticate with respect to a non-human target.

Because the configuration of an authentication device is the same as that of the First Embodiment, an explanation is omitted.

Below, an authentication process according to the Second Embodiment will be described.

Figure 8:
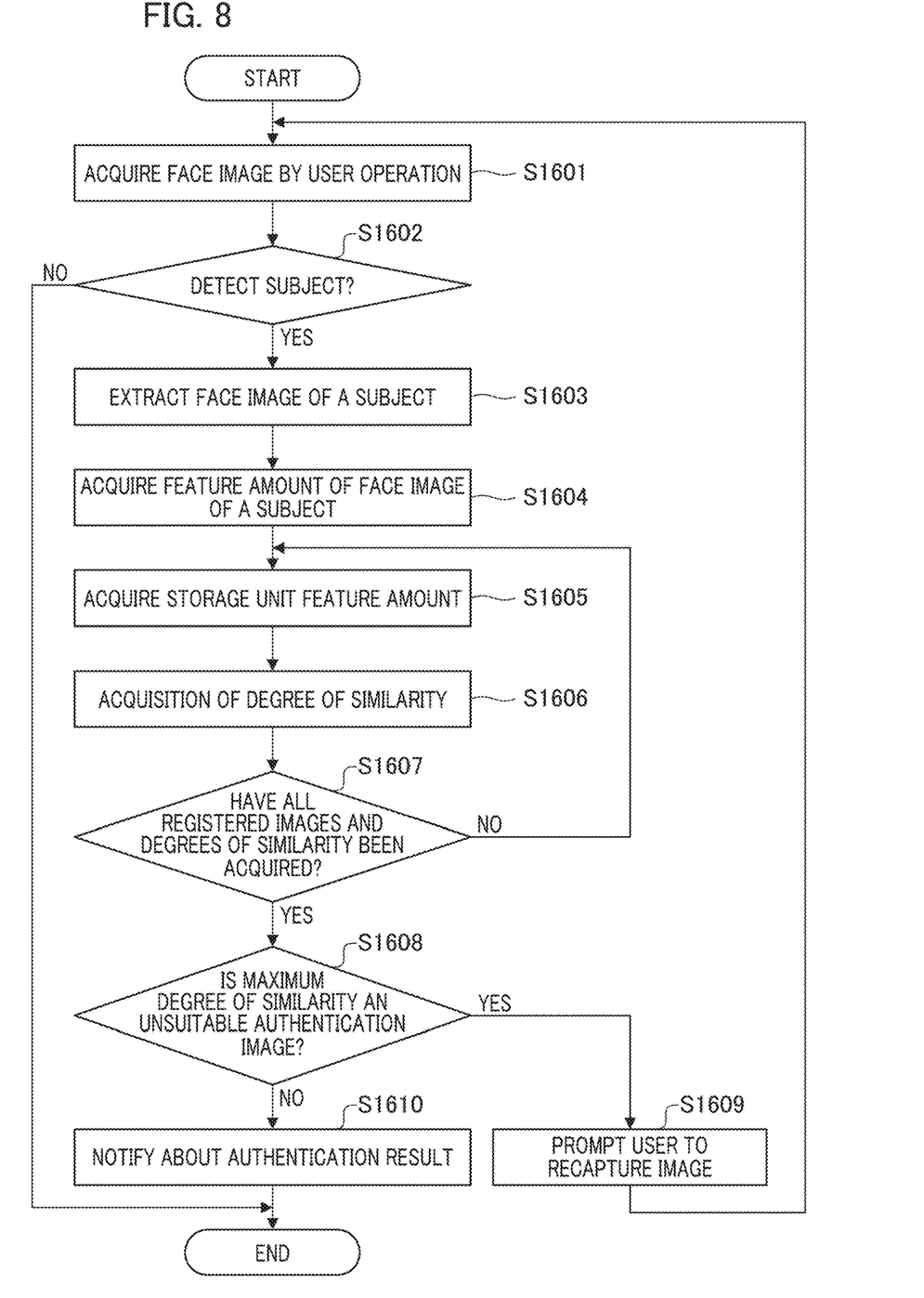
FIG. 8 is a flowchart showing a processing of authentication according to a second embodiment.

FIG. 8 is a flowchart showing a processing of authentication according to a Second Embodiment. In the flowchart of FIG. 8, an image is acquired from the input unit 1100 by a user operation, the feature amount of the subject and the feature amount stored in the storage unit 1200 are authenticated for the image by the authentication unit 1300, and the authentication result is output by the output unit 1400.

In step S1601, an image is acquired from the input unit 1100 by a user operation.

In step S1602, the face of the subject reflected in the image acquired in step S1601 is detected. If the face of the subject can be detected, the processing proceeds to step S1603. Otherwise, the processing ends.

In step S1603, the face image is extracted from the image acquired in step S1601 by using the face frame of the subject detected in step S1602.

In step S1604, a feature amount is acquired from the face image that has been acquired in step S1603.

In step S1605, one feature is acquired from the registered person feature amount in the storage unit 1200 and the unsuitable authentication feature amount.

In step S1606, the degree of similarity between the feature amount of the face image of the subject acquired in step S1604 and the feature amount acquired in step S1605 is acquired.

In step S1607, whether the degree of similarity between the feature amount acquired in step S1604 and all the feature amounts in the storage unit has been acquired is checked. If the degree of similarity with all the feature amounts in the storage unit 1200 is acquired, the processing proceeds to step S1608. Otherwise, the processing returns to step S1605, and a different feature amount is acquired from the storage unit 1200.

In step S1608, the maximum value is acquired from among the plurality of degrees of similarity acquired in step S1606. Then, the unsuitable authentication flag associated with the feature amount in the storage unit 1200 having the degree of similarity of the maximum value is acquired, and whether the image is an unsuitable authentication image (that is, whether the unsuitable authentication flag thereof is true) is checked. Here, step S1608 functions as a determination unit, and if the unsuitable authentication flag is true, the processing proceeds to step S1609. If it is false, the processing proceeds to step S1610.

In step S1609, assuming the image acquired in step S1601 is unsuitable for authentication, a notification prompting the user to recapture the image is output.

In step S1610, based on the plurality of degrees of similarity acquired in step S1606, the authentication result is acquired and notified to the user, and the processing ends. Note that, in the present embodiment, step S1609 and step S1610 function as a notification unit, and in a case where the determination unit does not authenticate the predetermined feature amount described above that has been generated by the feature amount generation unit, step 1609 prompts the user to recapture the image.

Note that, also in the Second Embodiment, in a case where a predetermined authentication condition is satisfied, in which the degree of similarity with the registered feature amount has become the degree of similarity of the maximum value, the NG information is checked with respect to the registered feature amount. However, for example, the fact that a degree of similarity with the registered feature amount is equal to or greater than a predetermined threshold may be set as a predetermined authentication condition.

Third Embodiment

In the embodiments described above, the unsuitability of the feature amount acquired from a face image is determined by presenting the image to the user, but the determination may also be performed automatically.

That is, in a Third Embodiment, when the registered person feature amount is newly registered in the storage unit 1200, whether the registered feature amount is sufficient for authentication is automatically determined, and if it is unsuitable for authentication, it is registered as an unsuitable authentication feature amount.

Figure 9:
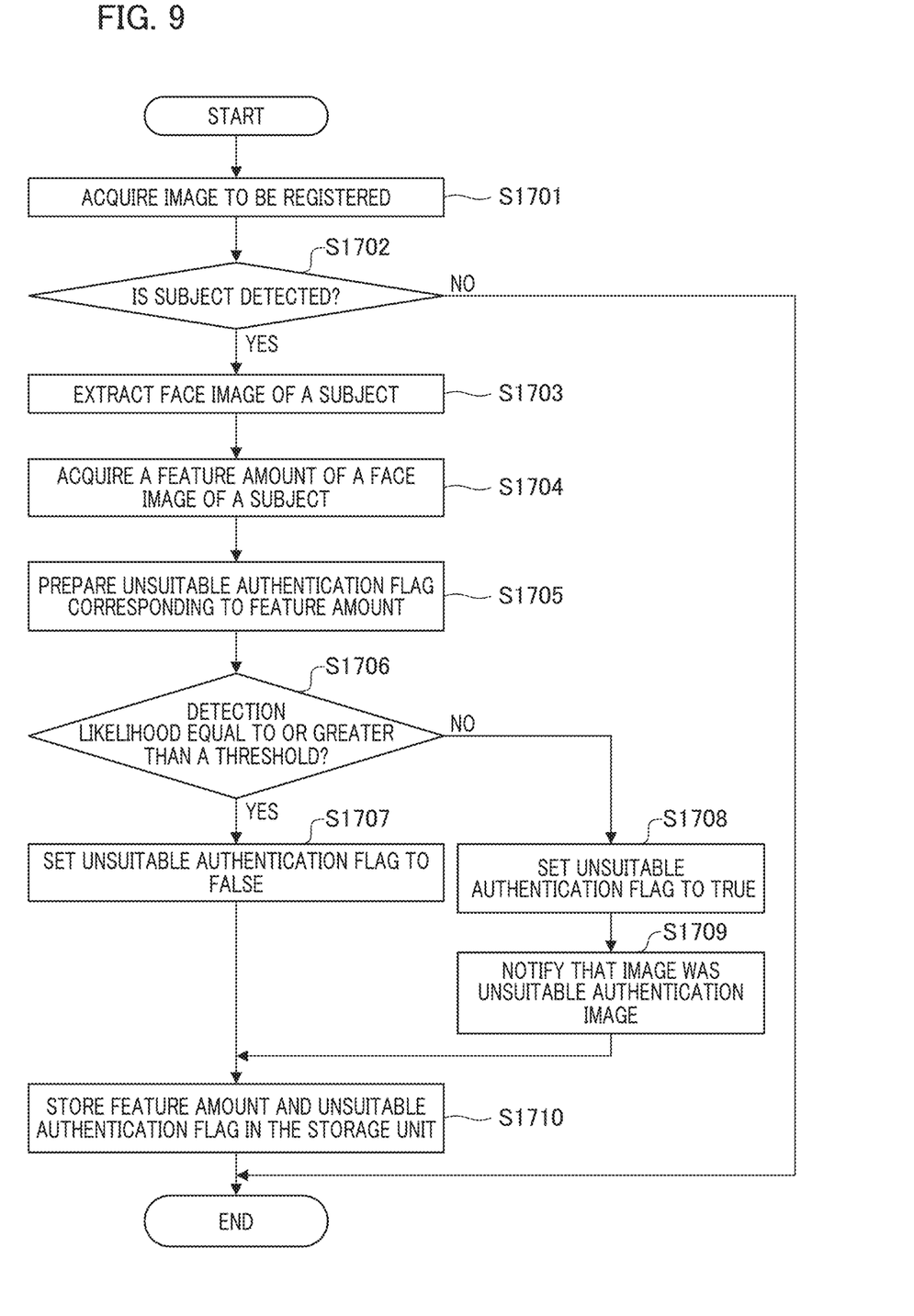
FIG. 9 is a flowchart showing a registration processing of an unsuitable authentication feature amount to the storage unit 1200 according to a third embodiment.

FIG. 9 is a flowchart showing a registration processing of an unsuitable authentication feature amount to a storage unit 1200 according to a Third Embodiment.

In step S1701, an image in which the person to be registered in the storage unit 1200 is reflected is acquired from the input unit 1100.

Thereafter, in step S1702, face detection is performed on the image acquired in step S1701, and if detection is possible, the processing proceeds to step S1703. If detection is not possible, the processing ends.

In step 1703, the face image is cropped from the image acquired in step S1701 by using the face frame detected in step S1702.

In step S1704, the feature amount is acquired from the face image that has been cropped in step S1703.

In step S1705, the unsuitable authentication flag corresponding to step S1704 is prepared.

In step S1706, whether the detection likelihood of the subject output in step S1702 is equal to or greater than the threshold or less than the threshold is determined. That is, whether the detection likelihood of the detected object is equal to or greater than, or less than a predetermined threshold is determined. Here, the detection likelihood is a value representing the face likeness of the detected object that is output during the face detection process in step S1702. Of course, the object is not limited to a face.

If the degree of similarity with the predetermined object is large, the detection likelihood may be set to be high. If this detection likelihood is equal to or greater than the threshold value, the processing proceeds to step S1707. Otherwise, the processing proceeds to step S1708. Note that alternatively, instead of the likelihood, the determination may be made based on whether the similarity is equal to or greater than, or less than a predetermined threshold.

In step S1707, the value of the unsuitable authentication flag prepared in step S1705 is set to false.

In step S1708, the value of the unsuitable authentication flag prepared in step S1705 is set to true. That is, in a case in which the detection likelihood of the predetermined object is less than a predetermined threshold, NG information is associated with the registered feature amounts of the predetermined object and registered.

In step S1709, the user is notified that the image acquired in step S1701 is an unsuitable authentication image.

In step S1710, the feature amount acquired in step S1704 and the unsuitable authentication flag set in step S1707 or step S1708 are associated and stored in the storage unit 1200.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to this embodiment, a computer program realizing the function of the embodiment described above may be supplied to the authentication device through a network or various storage media. Then, a computer (or a CPU, an MPU, or the like) of the authentication device may be configured to read and execute the program. In such a case, the program and the storage medium storing the program configure the present invention.

This application claims the benefit of Japanese Patent Application No. 2021-095097 filed on Jun. 7, 2021, which is hereby incorporated by reference herein in its entirety.

What is claimed is:

1. An authentication device, comprising:
at least one processor or circuit configured to function as:
a feature amount generation unit configured to generate a feature amount of an object included in an image,
a registered data acquisition unit configured to acquire registered data in which a feature amount of a predetermined object included in an image is registered in advance as a registered feature amount, and NG information associated with the registered feature amount is registered, wherein the NG information includes a feature amount of a face image that has been erroneously detected or that has a predetermined amount of blur, out-of-focus, or noise,
a similarity acquisition unit configured to acquire a degree of similarity between the predetermined feature amount generated from an authentication image by the feature amount generation unit and the registered feature amount acquired from the registered data acquisition unit, and
a determination unit configured to perform authentication in a case in which the degree of similarity acquired by the similarity acquisition unit is equal to or greater than a predetermined threshold value, and even if the degree of similarity is equal to or greater than the predetermined threshold value, in a case in which the NG information associated with the registered feature amount is acquired from the registered data acquisition unit, the predetermined feature amount generated by the feature amount generation unit is not authenticated.

2. The authentication device according to claim 1, further comprising a notification unit configured to provide notification about an authentication result by the determination unit.

3. The authentication device according to claim 2, wherein the notification unit does not notify a user of the authentication result in the case in which the predetermined feature amount generated by the feature amount generation unit is not authenticated.

4. The authentication device according to claim 2, wherein the notification unit prompts a user to perform image recapture in a case in which the predetermined feature amount generated by the feature amount generation unit is not authenticated.

5. The authentication device according to claim 1, wherein the registered data includes an image of the predetermined object.

6. The authentication device according to claim 5, comprising a display unit configured to display the image of the predetermined object in association with the NG information.

7. The authentication device according to claim 6, wherein the display unit includes a user interface for a user to change the NG information associated with the displayed image of the predetermined object by specifying a NG information associated with the display image of the predetermined object.

8. An authentication method, the method comprising:
a feature amount generation step of generating a feature amount of an object included in an image,
a registered data acquisition step of acquiring registered data in which a feature amount of a predetermined object included in an image is registered in advance as a registered feature amount, and NG information associated with the registered feature amount is registered, wherein the NG information includes a feature amount of a face image that has been erroneously detected or that has a predetermined amount of blur, out-of-focus, or noise,
a similarity acquisition step of acquiring a degree of similarity between a predetermined feature amount generated from an authentication image by the feature amount generation step and the registered feature amount acquired by the registered data acquisition step, and
a determination step of performing authentication in a case in which the degree of similarity acquired by the similarity acquisition step is equal to or greater than a predetermined threshold value, and even if the degree of similarity is equal to or greater than the predetermined threshold value, in a case in which the NG information associated with the registered feature amount is acquired from the registered data acquisition step, the predetermined feature amount generated by the feature amount generation step is not authenticated.

9. A non-transitory computer-readable storage medium configured to store a computer program, wherein the computer program comprises instructions for executing following processes:
a feature amount generation step of generating a feature amount of an object included in an image,
a registered data acquisition step of acquiring registered data in which a feature amount of a predetermined object included in an image is registered in advance as a registered feature amount, and NG information associated with the registered feature amount is registered, wherein the NG information includes a feature amount of a face image that has been erroneously detected or that has a predetermined amount of blur, out-of-focus, or noise,
a similarity acquisition step of acquiring a degree of similarity between a predetermined feature amount generated from an authentication image by the feature amount generation step and the registered feature amount acquired by the registered data acquisition step, and
a determination step of performing authentication in a case in which the degree of similarity acquired by the similarity acquisition step is equal to or greater than a predetermined threshold value, and even if the degree of similarity is equal to or greater than the predetermined threshold value, in a case in which the NG information associated with the registered feature amount is acquired from the registered data acquisition step, the predetermined feature amount generated by the feature amount generation step is not authenticated.

10. An authentication device, comprising:
at least one processor or circuit configured to function as:
a feature amount generation unit configured to generate a feature amount of an object included in an image,
a registered data acquisition unit configured to acquire registered data in which a feature amount of a predetermined object included in an image is registered in advance as a registered feature amount, and NG information associated with the registered feature amount registered, wherein the NG information includes a feature amount of a face image that has been erroneously detected or that has a predetermined amount of blur, out-of-focus, or noise,
a similarity acquisition unit configured to acquire a degree of similarity between the predetermined feature amount generated from an authentication image by the feature amount generation unit and the registered feature amount acquired from the registered data acquisition unit, and
a determination unit configured to perform authentication maximum value of the degree of similarity acquired by the similarity acquisition unit, and even if the degree of similarity is the maximum value, in a case in which the NG information associated with the registered feature amount is acquired from the registered data acquisition unit, the predetermined feature amount generated by the feature amount generation unit is not authenticated.

* * * * *